US00RE40979E

(19) United States
(12) Reissued Patent
Vinson

(10) Patent Number: US RE40,979 E
(45) Date of Reissued Patent: Nov. 17, 2009

(54) TARGETED DISASTER WARNING SYSTEM AND METHOD

(76) Inventor: R. Keith Vinson, 3408 Ridgedell Cir., Vestavia Hills, AL (US) 35243

(21) Appl. No.: 11/411,210

(22) Filed: Apr. 26, 2006

Related U.S. Patent Documents

Reissue of:
(64) Patent No.: 6,728,340
Issued: Apr. 27, 2004
Appl. No.: 10/331,995
Filed: Dec. 31, 2002

U.S. Applications:
(63) Continuation of application No. 09/409,687, filed on Sep. 30, 1999, now Pat. No. 6,594,345.

(51) Int. Cl.
*H04M 11/00* (2006.01)
*H04M 3/42* (2006.01)

(52) U.S. Cl. ..... 379/48; 379/207.16; 379/221.08

(58) Field of Classification Search ..... 329/37–51, 329/142.01, 201.01, 201.04, 201.08; 340/539.13, 340/539.14, 539.28
See application file for complete search history.

(56) References Cited

U.S. PATENT DOCUMENTS 5,701,301 A 12/1997 Weisser, Jr.
5,774,533 A 6/1998 Patel
6,002,748 A 12/1999 Leichner
6,021,177 A * 2/2000 Allport ..... 379/48
6,028,921 A * 2/2000 Malik et al. ..... 379/201.04
6,084,510 A 7/2000 Lemelson et al.
6,192,116 B1 * 2/2001 Mayak ..... 379/142.08
6,201,856 B1 3/2001 Orwick et al.
6,393,278 B1 5/2002 Buchanan et al.

OTHER PUBLICATIONS

Bellcore Technical Reference NWT–001188, Issue 1, "Class SM Feature: Calling Name Delivery Generic Requirements", FSD 01–02–1070 (Dec. 1991).
Bellcore Technical Reference NWT–000031, Issue 4, "Class SM Feature: Calling Number Delivery," FSD 01–02–1051 (Dec. 1992).

* cited by examiner

*Primary Examiner*—Melur Ramakrishnaiah
(74) *Attorney, Agent, or Firm*—Connolly Bove Lodge & Hutz LLP

(57) ABSTRACT

A system and method for providing early warning notifications to telephone subscribers having calling number delivery service. The system uses an advanced intelligent network to initiate several calls in rapid succession to all calling number delivery subscribers located within a predetermined geographic area. A code identifying the disaster warning message is transmitted to the subscribers' calling number delivery systems in place of an actual calling line identification. Subscribers having calling name delivery service receive the disaster code and a text message briefly describing the disaster warning.

28 Claims, 3 Drawing Sheets

TARGETED DISASTER WARNING SYSTEM AND METHOD

Matter enclosed in heavy brackets [ ] appears in the original patent but forms no part of this reissue specification; matter printed in italics indicates the additions made by reissue.

This is a continuation application that claims the benefit of U.S. patent application Ser. No. 09/409,687, filed Sep. 30, 1999, is now U.S. Pat. No. 6,594,345 which is incorporated by reference in its entirety.

BACKGROUND

1. Field of the Invention

The present invention relates generally to providing targeted disaster warnings to telephone subscribers in predetermined geographic areas.

2. Background of the Invention

Early warnings of natural (e.g., tornadoes) or man-made (e.g., leaks of toxic gases) disasters can save lives. However, any warning, no matter how timely, must be actually received by the people in danger, and must be heeded by the recipient if there is to be any benefit. Conventional systems for issuing disaster warnings may be directed to very large populations, for example, by radio or television, or may be directed to very small populations, for example, by people going house-to-house to notify the occupants. More recently, "weather radio" is being implemented to allow more localized warnings based on the listener's specific location.

However, all of these early warning systems have inherent disadvantages that reduce their effectiveness. For example, in the case of radio and television broadcasts, the television or radio sets must be turned on and monitored for the warning to be received. Moreover, it is not uncommon for the power systems in disaster zones to be out of operation, further limiting the likelihood that the target audience will receive the warnings. Finally, because television is designed to reach a maximum audience in a geographic region, it cannot currently be used to specifically target only those in the greatest danger. Thus, the warnings are sent to far more people than actually need to be warned. If people are often interrupted by alarms that do not apply to them, then they are less likely to heed subsequent warnings.

The "weather radio" system, when fully implemented, may overcome some of these limitations by issuing a radio signal to specially purchased radio receivers. The signal will cause the radio set to turn itself on and broadcast the warning to all listeners. However, even this solution has some disadvantages. First, the system is not in widespread use because it requires the purchase of a special radio receiver. Second, while weather radio can be directed toward a more specific geographic area than other broadcasting means, it cannot target very small regions, such as people located on a certain street. More people will receive the warning than are actually in danger, resulting in false alarms for many people. Thus, with weather radio systems, the result could be even more dangerous, as people who have been inconvenienced by false alarms may disable the feature or merely ignore further weather radio warnings.

When house-to-house personal warnings are issued, or neighborhood-wide announcements made via loud speakers, the deficiency is not in reaching the correct audience, but reaching them in time to provide sufficient early warning. Even if the target area is very small, if the danger stems from a rapidly moving force, such as a tornado, personal notification cannot provide the necessary early warning.

SUMMARY OF THE INVENTION

The present invention utilizes an Advanced Intelligent Network ("AIN") to provide early disaster warnings to recipients in specifically targeted geographic areas. AIN systems are described in U.S. Pat. No. 5,701,301 and U.S. Pat. No. 5,774,533, which are incorporated herein by reference in their entirety. The invention uses existing calling number delivery ("CND") and calling name delivery ("CNAM") systems to provide early disaster warnings to subscribers within the targeted areas. The invention includes a specialized service node ("S-SN") shown in the FIG. 1. The S-SN is connected to a computer control terminal that defines the geographic area to which the targeted warning message must be sent. The S-SN is a service node, as is currently well known in the art, with added capabilities such as multiple communications links to multiple service switching points ("SSPs" or "switches"). Additionally, the S-SN is programmed to partially emulate an SSP by issuing call setup and release messages to other SSPs using the Common Channel Signaling System 7 ("SS7") network. However, in a preferred embodiment, the S-SN has no actual voice trunks installed, i.e., does not emulate the full capabilities of an SSP. In a preferred embodiment, the computer control terminal is operated by a national or regional authority such as the National Weather Service ("NWS").

In the present invention, an operator (or software) on the computer control terminal transmits a warning message to the S-SN along with the geographic regions to be warned. In a preferred embodiment, the computer control terminal is equipped with a graphical user interface allowing an operator to select the warning area by highlighting different portions of a map. The maps used in this preferred embodiment have a range of scales, down to the street-level, enabling highly specific targeting of the warning area.

In a preferred embodiment, the S-SN maintains a database of all customers having subscriptions to CND service, CNAM service or both. The database includes the subscribers' telephone number and geographic location (e.g., a street address). In an alternate embodiment, the database stores information only for those customers specifically subscribing to the Disaster Warning service. The S-SN identifies the subscribers within the specific geographic region to be warned and initiates a series of telephone calls in rapid succession to all of the identified subscribers. The S-SN issues call setup messages in which the Calling Party Number ("CgPN") field is set to a numeric code corresponding to the type of emergency. In this way, when a subscriber's customer premises equipment ("CPE") displays the calling party's number, it displays the special warning code. Each type of emergency or action required is assigned a unique numeric code. When the numeric code is displayed as the calling number, the subscriber is alerted to the disaster.

Subscribers having CNAM service receive a text message displaying a brief warning message. In a preferred embodiment, a text message and the numeric code for each Disaster_Type are stored in an existing name database used to support CNAM services. Such name databases are generally stored on a Service Control Point ("SCP"). In response to a CNAM query, the SCP returns the disaster text message for display on the subscriber's CPE. The text display provides all the information necessary to alert the subscriber of the impending danger. In an alternate embodiment, the disaster text message is contained within the call setup message issued by the S-SN. In this embodiment, a database query is not necessary.

The S-SN follows each call setup message with a call release message. However, to allow sufficient time for the delivery of the calling number and/or calling name, the call release message is sent only after a pre-determined waiting period elapses. The pre-determined waiting period is at least as long as the name retrieval timer set within the switch, i.e., the timeout period for CND or CNAM services. In a preferred embodiment, the pre-determined waiting period is at least six seconds.

It is an object of the present invention to provide a disaster warning system that overcomes the above-cited problems. More specifically, it is an object of the present invention to provide a disaster warning system that is targeted to reach only people in imminent danger.

Another object of the present invention is to provide a disaster warning system that minimizes the incidence of false alarms.

Another object of the present invention is to provide a disaster warning system that is compatible with existing telecommunications equipment.

Another object of this invention is to provide a disaster warning system using telecommunications equipment that is already prevalent in people's homes and/or workplaces.

Another object of the present invention is to provide a disaster warning system capable of reaching people in a targeted area almost simultaneously with the determination to issue the warning.

DETAILED DESCRIPTION OF THE INVENTION

The present invention utilizes an Advanced Intelligent Network ("AIN") to provide the targeted disaster warning of the present invention. More specifically, the present invention uses CND and CNAM systems to provide targeted disaster warnings to subscribers within specific geographic areas. The implementation and operation of CND systems are described in Bellcore Specification TR-NWT-000031, Calling Number Delivery, which is incorporated herein by reference in its entirety. CNAM systems are described in Bellcore Specification TR-NWT-001188, Calling Name Delivery Generic Requirements, which is incorporated herein by reference in its entirety.

Figure 1:
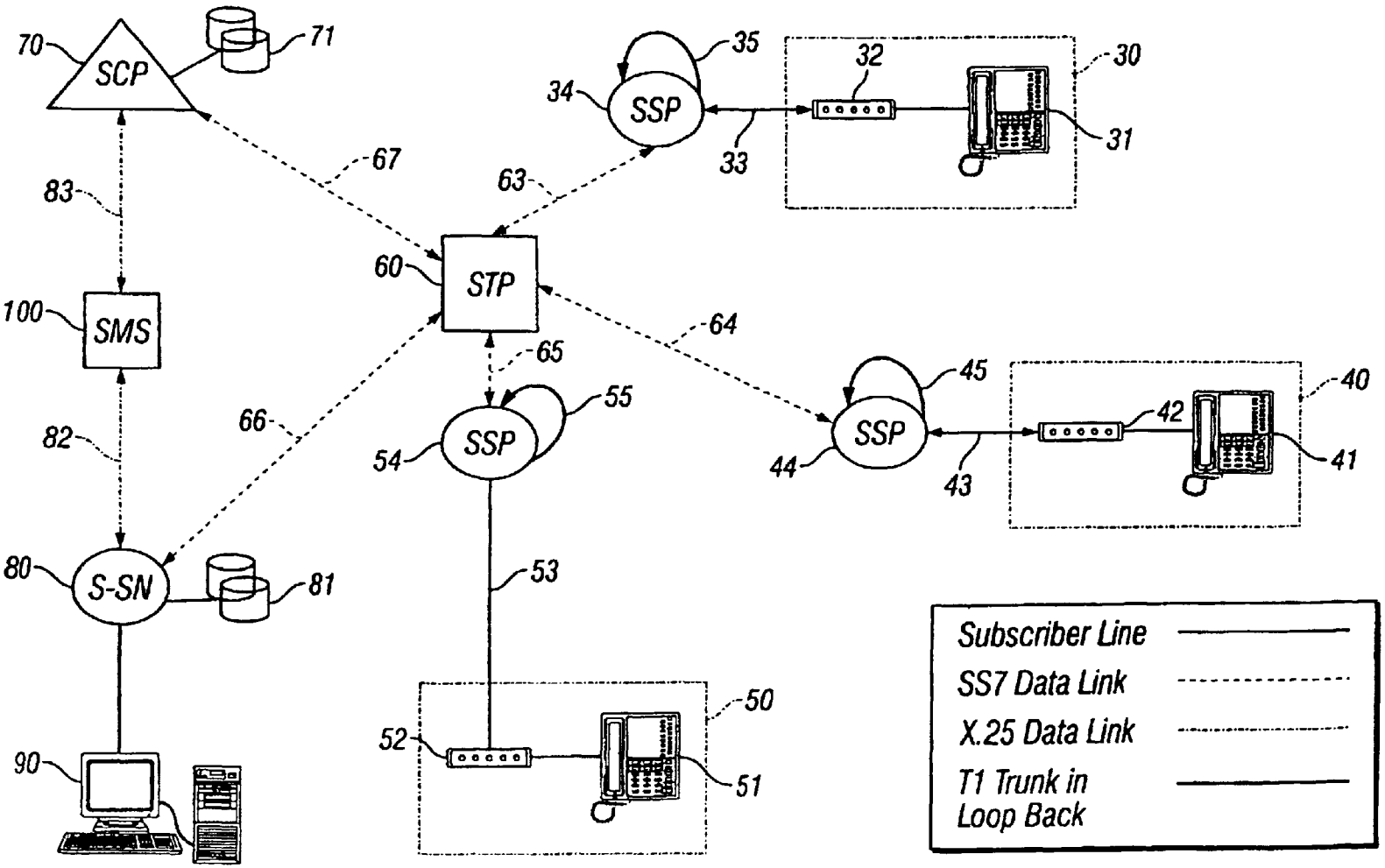
FIG. 1 is a schematic diagram showing the key components of an Advanced Intelligent Network used in an embodiment of the present invention.

FIG. 1 is a schematic diagram of the present invention showing a Specialized Service Node ("S-SN") 80. S-SN 80 has all of the features of a regular Service Node ("SN"), but is also equipped with Common Channel Signaling System 7 ("SS7") data links, and has the capability of issuing telephone call setup and release messages to several Service Switching Points (referred to herein as either "SSP" or "switch") simultaneously. Such call setup and release messages are transmitted over SS7 data link 66 as Integrated Services Digital Network User Part ("ISUP") messages. The capability to issue ISUP messages allows S-SN 80 to emulate some functions of a switch. However, in a preferred embodiment, S-SN 80 has no voice trunks, so although it issues ISUP messages, no actual voice circuits are allocated between S-SN 80 and a switch. S-SN 80 transmits ISUP messages using SS7 link 66 to Signaling Transfer Point ("STP") 60. STP 60 has SS7 links 63, 64, 65 and 67 to Service Switching Point ("SSP") 34, SSP 44, SSP 54 and Service Control Point ("SCP") 70, respectively. Additionally, in a preferred embodiment, S-SN 80 receives database updates from Services Management System ("SMS") 100 using data link 82. In a preferred embodiment data link 82 uses a high-speed data communications protocol, such as Asynchronous Transfer Mode ("ATM"), TCP/IP or X.25, each of which are well known in the art.

S-SN 80 is connected to computer control terminal 90 which is used to define the geographic area in which to send the targeted warning message. In a preferred embodiment, computer control terminal 90 is operated by a national or regional authority such as the National Weather Service or a state-operated disaster prevention/alerting body.

Figure 2A:
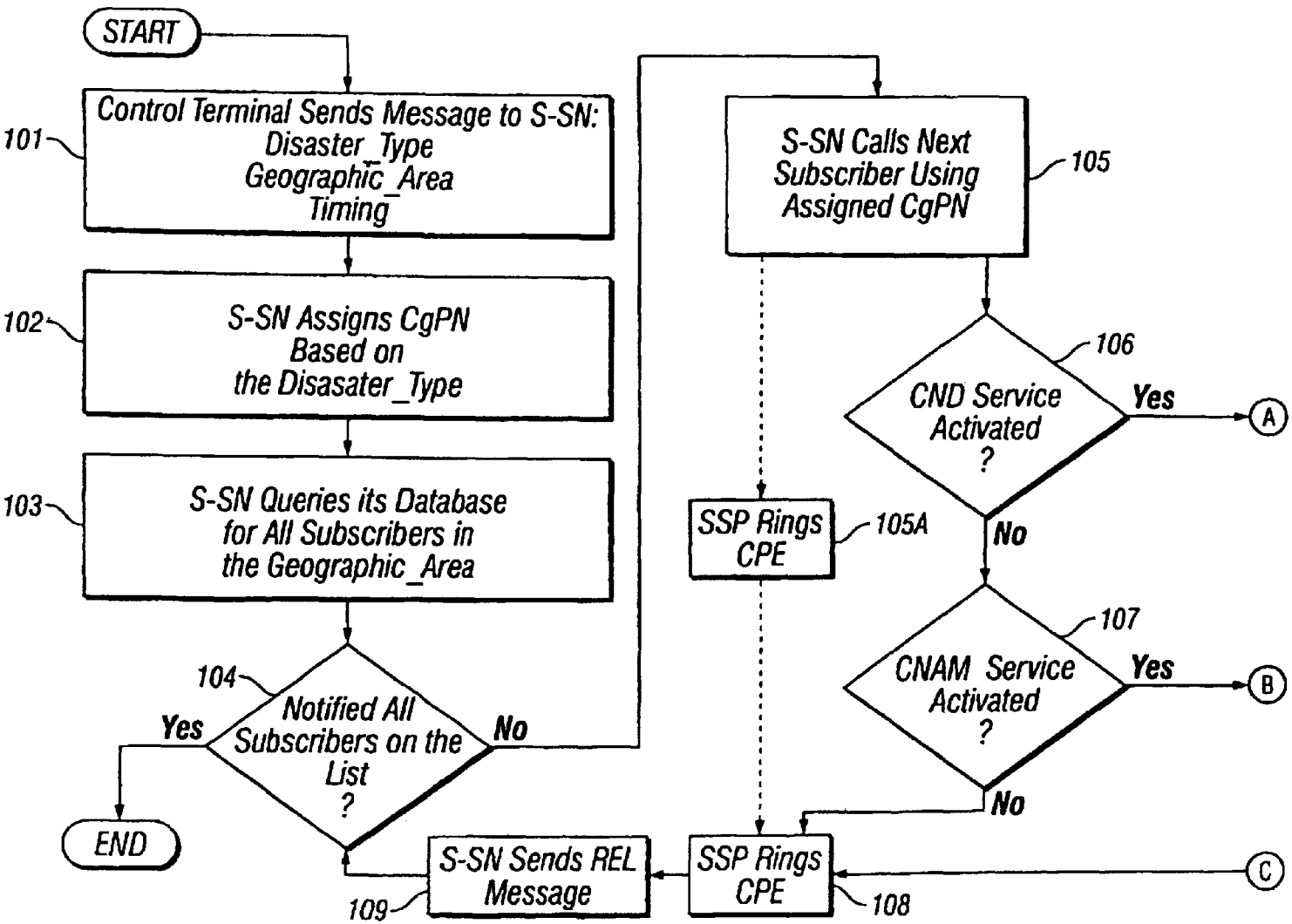
FIG. 2 is a flowchart showing the steps performed in an embodiment of the present invention.
Figure 2B:
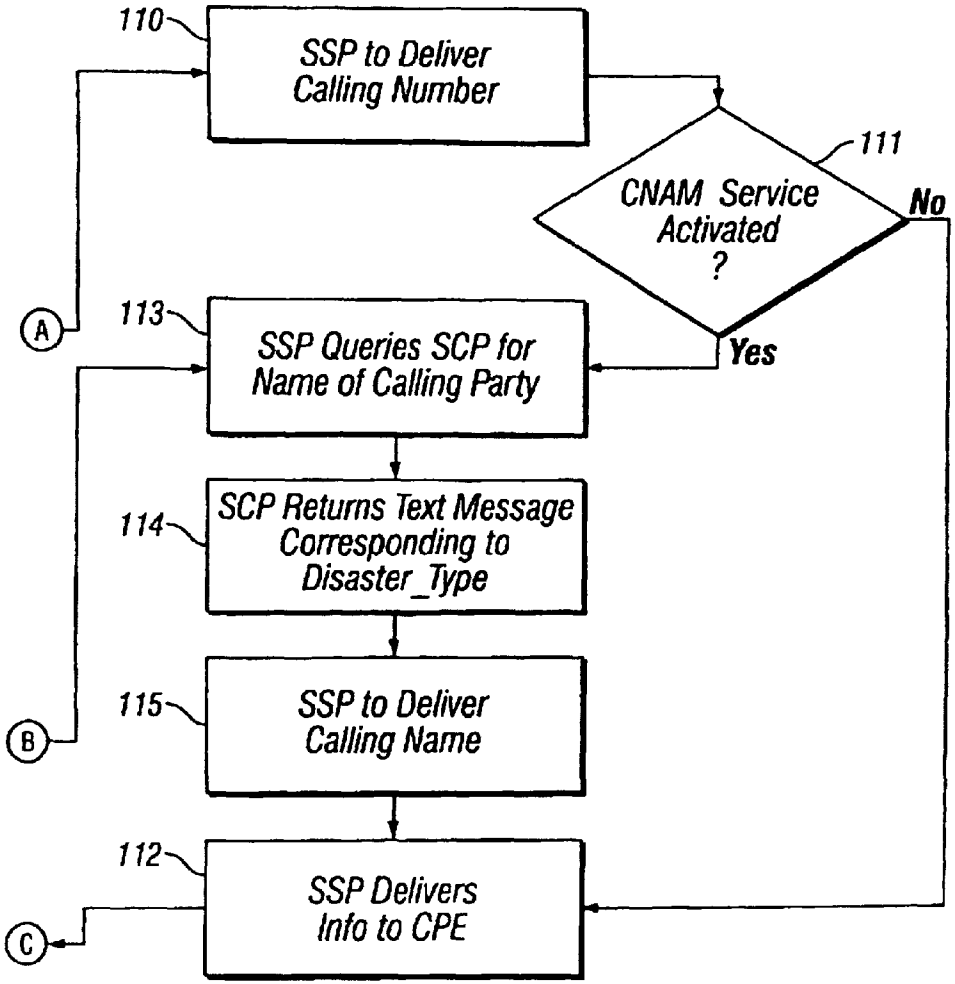

FIG. 2 is a flow chart exemplifying the steps performed in an embodiment of the present invention. The flow chart is described with reference to subscribers 30, 40 and 50 in FIG. 1. Subscriber 30 has telephone 31, CPE 32, and analog telephone line 33 connected to SSP 34. Subscriber 40 has telephone 41, CPE 42, and analog telephone line 43 connected to SSP 44. Similarly, subscriber 50 has telephone 51, CPE 52, and analog telephone line 53 connected to SSP 54. Lines 33, 43 and 53 have telephone numbers 333-333-1000, 444-444-1000 and 555-555-1000, respectively. In this example, subscribers 30, 40 and 50 live on Street A. Subscriber 30 has CND service, subscriber 40 has CNAM service, and subscriber 50 and both CND and CNAM services. It should be noted that while it is possible for a subscriber to subscribe only to CNAM service, few subscribers would get CNAM without CND.

In the first step, an operator (or software) on computer control terminal 90 transmits a warning message to S-SN 80 (step 101). In one embodiment, the warning message includes information such as the Disaster Type and the Geographic_Area. In a preferred embodiment, the message includes additional information such as a Timing parameter, described below.

Each Disaster_Type is assigned a unique numeric code, so the recipient can decipher the warning message. The numeric code is used in the Calling Party Number ("CgPN") field when the warning calls are setup (step 102). Thus, under current AIN standards, the numeric code is limited to 15 digits. In one embodiment, the Disaster_Type received from control terminal 90 is the unique numeric code. For example, the Disaster_Type could be "911-222-3333" to indicate a category 3 tornado. In an alternate embodiment, S-SN 80 looks up the numeric code in database 81 according to the Disaster_Type. In the present example if the NWS sends a warning message with a Disaster_Type of "category 3 tornado," S-SN 80 consults database 81 to determine that the assigned numeric code is 911-222-3333. Thus, in step 102, S-SN 80 assigns 911-222-3333 to the CgPN in the call setup messages.

The Geographic_Area identifies the region to which the targeted warning message will be sent. In a preferred embodiment, a graphical user interface on computer control terminal 90 provides the capability for selecting the Geographic_Area directly from a mapping system. The maps used in this preferred embodiment provide a high level of granularity enabling highly specific targeting of the area to be warned. Using this system, the operator is able to zoom down to the street-level to select the houses to be notified on a particular street.

The Timing parameter is used to control congestion on the system. In a preferred embodiment, the Timing indicates the order in which to notify subscribers, such as to notify subscribers from Northeast to Southwest within the Geographic_Area selected. In this embodiment, if the Timing is not provided by control terminal 90, all customers in the Geographic_Area have the same priority.

In a preferred embodiment, the Disaster Warning service is offered as a complimentary service to customers subscribing to CND service or CNAM service. In this embodiment, database 81 on S-SN 80 stores the telephone number and address for all customers having subscriptions to CND service, CNAM service or both. In an alternate embodiment, the Disaster Service is offered on a subscription basis. In this embodiment, the database stores information only for those customers also subscribing to the Disaster Warning service. The data stored in database 81 is provided by and updated by SMS 100, which also provides data to SCP 70 for use in database 71. Data paths 82 and 83 from SMS 100 to S-SN 80, and from SMS 100 to SCP 70, respectively, use any suitable digital communications protocol, for example, ATM, TCP/IP or X.25.

In step 103, S-SN 80 queries database 81 to identify the subscribers within the specific geographic region to be warned. In this example, the NWS warning message indicated the Geographic_Area to be "all houses on Street A." Thus, in step 103, S-SN 80 compiles a list of all subscribers on Street A, including subscribers 30, 40 and 50.

In an iterative manner, S-SN 80 steps through the list of subscribers obtained in step 103 and generates call setup messages for each. In step 104, S-SN 80 checks to see if all subscribers on the list have been called. If there are any subscribers that have not been called, S-SN 80 moves on to step 105; otherwise, the disaster warning system has completed its task.

In step 105, S-SN 80 issues ISUP messages to setup calls to each subscriber. The ISUP messages are Initial Address Messages ("IAMs") which are sent to each subscriber's SSP. The IAM contains the assigned numeric code for the given disaster type in the CgPN field, and the subscriber's telephone number in the Called Party Number ("CdPN") field. For example, an IAM is sent to SSP 34 for subscriber 30, another IAM is sent to SSP 44 for subscriber 40, and a third IAM is sent to SSP 54 for subscriber 50. The first IAM has 911-222-3333 as the CgPN and 333-333-1000 as the CdPN. The second IAM has 911-222-3333 as the CgPN and 444-444-1000 as the CdPN. Finally, the third IAM has 911-222-3333 as the CgPN and 555-555-1000 as the CdPN.

Because the S-SN does not need to send any voice traffic to the subscriber, there is no need to allocate actual voice circuits between the S-SN and the subscriber. However, under the current telephone switching architecture, an SSP will not attempt call termination unless a voice circuit is established between a CgPN and a CdPN. Thus, in a preferred embodiment of the present invention, the SPPs are "tricked" by using special voice circuits 35, 45 and 55 in a loop-back configuration, as shown in FIG. 1. When an SSP receives the call setup message from S-SN 80, the SSP will process the call as if an actual voice circuit were allocated. In a preferred embodiment, loop-back voice circuits 35, 45 and 55 are created by configuring at least one trunk interface card to loop-back to itself. Suitable trunk interface cards are available from several vendors, e.g., Lucent, Nortel and Siemens. Additionally, voice path verification must be turned off for that trunk group so that the SSP will not check to see if the circuit is valid. S-SN 80 is capable of sending these call setup messages to several SSPs at once because it has an SS7 connection to STP 60.

Although the subscribers listed in database 81 are all subscribers to CND, CNAM or both, the subscriber may have temporarily deactivated the services. Thus, when the subscriber's SSP receives the IAM, it detects whether or not the called line is activated for CND service, CNAM service or both (steps 106, 107 and 111). As shown in FIG. 2, step 105A is usually performed concurrently with steps 106–108 to minimize delays in call processing. In step 105A, the SSP initiates power ringing on the subscriber's line. The remaining steps (106–115) in the flow chart are described in the four examples below.

EXAMPLE I

Subscriber Has Neither CND Nor CNAM Activated

In this example, although subscriber 30 normally subscribes to CND service, it has been deactivated. Thus, for subscriber 30, SSP 34 will detect that neither CND nor CNAM service is currently activated for line 33 (steps 106 and 107). In this case, SSP 34, moves on to step 108, and continues ringing the line. After waiting a pre-determined period, S-SN 80 informs the SSP that the calling party has hung up (step 109). In a preferred embodiment, S-SN 80 sends a call release (REL) message to the SSP. The waiting period should be long enough to ensure that any data to be transmitted to the subscriber's CPE has been sent. Since CND and CNAM delivery normally takes places between the first and second ring cycle, the waiting period should allow for two ringing cycles to complete. In a preferred embodiment, the pre-determined waiting period is at least six seconds. After sending the call release message, S-SN 80 returns to step 104 and determines whether or not another subscriber is to be notified, as described above.

EXAMPLE II

Subscriber Has CND Only

In this example, subscriber 30 has CND and has not deactivated the service. Thus, in step 106 SSP 34 detects that CND is activated on line 33, and as a result, prepares to deliver the calling number to CPE 32 (step 110). In step 111, SSP 34 detects whether or not line 33 also has CNAM activated. In this example, line 33 does not have CNAM activated, so SSP 34 moves on to step 112. In step 112, SSP 34 delivers the information to CPE 32. That is, SSP 34 uses frequency-shift keying ("FSK") tone modulation to transmit the CgPN for display on CPE 32. In this case, the disaster warning code of "911-222-3333" will be transmitted to CPE 32, along with the date and time. When subscriber 30 sees this displayed on CPE 32, he or she will be informed of the disaster alert.

After delivering the disaster warning code in step 112, SSP 34 moves on to step 108. As described above, in step 108, SSP 34 continues ringing line 33 until it receives the call release message from S-SN 80 in step 109. S-SN 80 then moves on to the next subscriber to be notified in steps 104 and 105.

EXAMPLE III

Subscriber Has CNAM Only

In this example, subscriber 40 has CNAM service but does not have CND service. Again, this is an unusual situation, but could occur under current AIN standards. In step 106 SSP 44 detects that CND is not activated on line 43, and as a result, moves on to step 107 where SSP 44 detects that CNAM is activated on line 43. In this case, SSP 44 moves on to step 113. In step 113, SSP 44 queries SCP 70 for the calling party name using SS7 Transaction Capabilities Application Part ("TCAP") messaging. SCP 70 looks up the CgPN in name database 71 and returns the corresponding name. In this example, when SSP 44 looks up the calling party number, "911-222-3333" in name database 71, the calling party's "name" identifies the Disaster_Type. Thus in step 114, SCP 70 sends a TCAP response message having "Tornado Cat. 3" in the calling name field. SSP 44 prepares to deliver the calling party name to CPE 42 in step 115, then moves on to step 112. As described above, in step 112, SSP 44 transmits the calling party name, together with a date and time stamp to CPE 42 using FSK tone modulation. The disaster warning is displayed on CPE 42 as "Tornado Cat. 3" and subscriber 40 can readily determine that a severe tornado is imminent.

The remaining steps are the same as those described for basic CND above. That is, for subscriber 40, SSP 44 continues ringing line 43 in step 108. In step 109, S-SN 80 issues a call release message to SSP 44 (after waiting the pre-determined wait period), and moves on to the next subscriber (step 104).

EXAMPLE IV

Subscriber Has Both CND and CNAM

In this example, subscriber 50 has both CND and CNAM services and both services are activated. In step 106 SSP 54 detects that CND is activated on line 53, and as a result, prepares to deliver the calling number to CPE 52. In step 111, SSP 54 detects whether or not line 33 also has CNAM activated. In this case, line 53 has CNAM activated, so SSP 54 moves on to step 113. Steps 113 through 115 are performed as described in Example III, above. That is a TCAP query is issued to SCP 70 and, in response, the disaster warning message is sent to SSP 54. In step 112, SSP 54 transmits the information to CPE 52. In this case, both the calling party number and the calling party name, together with a date and time stamp are transmitted to CPE 52. As before, SSP 54 uses FSK tone modulation to transmit the information to CPE 52. The disaster warnings is displayed on CPE 52 as "911-222-333 Tornado Cat. 3" and subscriber 50 can readily determine that a severe tornado is imminent.

The remaining steps are the same as those followed for CND or CNAM services, described in Examples II and III, above. That is, for subscriber 50, SSP 54 continues ringing line 53 in step 108. In step 109, S-SN 80 issues a call release message to SSP 54 (after waiting the pre-determined wait period), and moves on to the next subscriber (step 104).

Alternate Embodiments

In one alternate embodiment, an extended audible or visible alarm could be implemented by modifying the CPE. In this manner, a specialized CPE could be designed to trigger based on specified CgPNs or CNAMs, which are internally preset or programmed into the CPE. For example, if the CgPN for "Tornado Warning" is 911-222-1111, the CPE would read that number and activate the alarm. In another alternate embodiment, one skilled in the art could modify the CPE to issue a loud audible alarm, a visible alarm such as a flashing light, or a vibrating alarm. The type of sound, vibration, or pattern of flashes could be unique depending on the CgPN, e.g., different sounds or flash patterns could represent different types of warnings. An alarm system as described above is advantageous in that it increases the likelihood that the alarm will be noticed. This modified CPE would work with both basic CND and CNAM service services.

In another alternate embodiment, the need for a TCAP query is eliminated by programming the S-SN to include the disaster warning text in the IAM message itself. Under current AIN standards, IAM messages have a calling party name field which may be used for this purpose. In this embodiment, the disaster warning messages can be transmitted even faster with less load on the systems involved. However, the switch must also be programmed to look for the calling party name in IAM.

The foregoing disclosure of embodiments of the present invention has been presented for purposes of illustration and description. It is not intended to be exhaustive or to limit the invention to the precise forms disclosed. Many variations and modifications of the embodiments described herein will be obvious to one of ordinary skill in the art in light of the above disclosure. The scope of the invention is to be defined only by the claims appended hereto, and by their equivalents.

What is claimed is:

1. A method for providing warning to telephone subscribers comprising:

receiving information related to a disaster and a target geographic area associated with the disaster;

querying a database for a first telephone number that corresponds to the disaster and a second telephone number having an address within the target geographic area, wherein the second telephone number has one or both of a calling number delivery subscription and a calling name delivery subscription;

sending a call setup message from a specialized service node to a service switching point, wherein the first telephone number is in a calling party field and the second telephone number is in a called party field;

[thereafter, sending a call release message from the specialized service node to the service switching point;] and issuing the call setup message from the service switching point to a subscriber of the second telephone number for providing a disaster warning message.

2. The method of claim 1, wherein the second telephone number further has a calling name delivery subscription.

3. The method of claim 2, further comprising determining a disaster warning message.

4. The method of claim 3, further comprising transmitting the disaster warning message.

5. The method of claim 1, wherein the information is received from an entity associated with weather.

6. The method of claim 5, wherein the authority is the National Weather Service.

7. The method of claim 1, further comprising waiting a pre-determined amount of time [before] *and then* sending [the] *a* call release message from the specialized service node to the service switching point.

8. A method for providing warning to telephone subscribers comprising:

receiving information related to a disaster and a target geographic area associated with the disaster;

querying a database for a first telephone number that corresponds to the disaster and a second telephone number associated with a street address within the target geographic area, wherein the second telephone number has one or both of a calling number delivery subscription and a calling name delivery subscription;

instructing a specialized service node to send a disaster warning message associated with the first telephone number to a service switching point associated with the second telephone number, wherein the disaster warning message includes one or both of the first telephone number and a text message regarding the disaster depending on which of the calling number delivery subscription and the calling name delivery subscription is associated with the second telephone number;

[thereafter, instructing the specialized service node to send a call release message to the service switching point;] and forwarding the disaster warning message from the service switching point to a subscriber associated with the second telephone number.

9. The method of claim 8, wherein the information is received from an entity associated with weather.

10. The method of claim 9, wherein the entity is the National Weather Service.

11. The method of claim 8, wherein the database is accessible to the specialized service node.

12. The method of claim 8, wherein the database is resident on the specialized service node.

13. The method of claim 8, wherein the disaster warning message includes the first telephone number in a calling party field if the second telephone number is associated with the calling number delivery subscription.

14. The method of claim 8, wherein the disaster warning message includes the text message regarding the disaster if the second telephone number is associated with the calling name delivery subscription.

15. The method of claim 8, wherein the message includes the brief warning message if the second telephone number is associated with the calling name delivery subscription.

16. A method for providing warning to telephone subscribers comprising:

receiving information related to a disaster and a target geographic area associated with the disaster;

querying a database for a first telephone number that corresponds to the disaster and a second telephone number associated with a street address within the target geographic area;

instructing a specialized service node to send a disaster warning message associated with the first telephone number to a service switching point associated with the second telephone number, wherein the message includes one or both of the first telephone number and a text message;

thereafter, [sending a call release message from the specialized service node to the service switching point, wherein the service switching point forwards] *forwarding* the disaster warning message *from the service switching point* to a subscriber associated with the second telephone number depending on a specialized service being subscribed *to* by the subscriber.

17. The method of claim 16, wherein the specialized service is a calling number delivery service.

18. The method of claim 17, wherein the message includes a numeric code.

19. The method of claim 18, wherein the numeric code corresponds to the disaster.

20. The method of claim 16, wherein the specialized service is a calling name delivery service.

21. The method of claim 20, wherein the message includes a warning about the disaster.

*22. The method of claim 8, further comprising:*

*instructing the specialized service node to send a call release message to the service switching point following said instructing a specialized service node to send a disaster warning message.*

*23. The method of claim 17, further comprising:*

*sending a call release message from the specialized service node to the service switching point following said instructing a specialized service node to send a disaster warning message.*

*24. A system to provide a warning to system subscribers, comprising:*

*a service node to be coupled to a database storing a plurality of telephone numbers and corresponding geographic locations, the service node to receive information relating to an event warranting a warning, the information including an event type and an affected geographic area, the service node to select from among the plurality of telephone numbers only those telephone numbers whose corresponding geographic locations lie within said affected geographic area and to initiate communication to those selected telephone numbers using one or more messages that include a telephone number to encode said event type; and*

*a switch coupled to said service node to receive at least one of said messages and to communicate with customer premises equipment at one or more of those selected telephone numbers to transmit a warning corresponding to the telephone number to encode said event type.*

*25. The system of claim 24, wherein the database is populated with a plurality of preexisting data from a services management system.*

*26. The system of claim 24, further comprising:*

*a control terminal to be connected to the service node.*

*27. The system of claim 24, wherein the service node is to be coupled to said switch via a Common Channel Switching System 7 (SS7) data link.*

*28. The system of claim 27, further comprising:*

*at least one further switch, also to be coupled to the service node via a SS7 data link;*

*wherein said service node has the capability of issuing SS7 messages to more than one switch simultaneously.*

* * * * *

UNITED STATES PATENT AND TRADEMARK OFFICE

CERTIFICATE OF CORRECTION

PATENT NO. : RE 40,979 E
APPLICATION NO. : 11/411210
DATED : November 17, 2009
INVENTOR(S) : R. K. Vinson It is certified that error appears in the above-identified patent and that said Letters Patent is hereby corrected as shown below:

Claim 23, column 10, line 12, "claim 17" should read "claim 16".

Signed and Sealed this

Sixteenth Day of February, 2010

David J. Kappos

David J. Kappos
*Director of the United States Patent and Trademark Office*